(12) United States Patent
Jalove et al.

(10) Patent No.: US 7,070,369 B2
(45) Date of Patent: Jul. 4, 2006

(54) APPARATUS CAPABLE OF POSITIONING A KEY BLANK RELATIVE TO CUTTING DEVICE IN MULTIPLE OPERATIONAL MODES

(75) Inventors: Martin Jalove, Arlington Heights, IL (US); Esteban Suarez, Chicago, IL (US)

(73) Assignee: HPC, Inc., Schiller Park, IL (US)

( * ) Notice: Subject to any disclaimer, the term of this patent is extended or adjusted under 35 U.S.C. 154(b) by 99 days.

(21) Appl. No.: 10/710,443

(22) Filed: Jul. 12, 2004

(65) Prior Publication Data

US 2006/0008333 A1    Jan. 12, 2006

(51) Int. Cl.
*B23C 3/35* (2006.01)
(52) U.S. Cl. .............................. 409/84; 409/81; 409/82
(58) Field of Classification Search ............ 409/81–84, 409/132; 83/917
See application file for complete search history.

(56) References Cited

U.S. PATENT DOCUMENTS

| | | | |
|---|---|---|---|
| 1,750,218 A | 3/1930 | Falk | |
| 1,775,921 A * | 9/1930 | Williams | ...................... 409/81 |
| 3,440,906 A | 4/1969 | Allen | |
| 3,722,341 A | 3/1973 | Hungerford, Jr. et al. | |
| 4,012,991 A | 3/1977 | Uyeda | |
| 4,090,303 A | 5/1978 | Uyeda | |
| 4,117,763 A | 10/1978 | Uyeda | |
| 4,780,032 A | 10/1988 | Uyeda et al. | |
| 4,898,504 A | 2/1990 | Agius et al. | |
| 5,054,350 A | 10/1991 | Gartner et al. | |
| 5,128,531 A | 7/1992 | Fadel | |
| 5,415,302 A | 5/1995 | Carlson et al. | |
| 5,676,504 A | 10/1997 | Mueller et al. | |
| 5,711,643 A | 1/1998 | Parr et al. | |
| 5,951,218 A * | 9/1999 | Wu | .............................. 409/81 |
| 5,997,224 A | 12/1999 | Beauregard et al. | |
| 6,152,662 A | 11/2000 | Titus et al. | |
| 6,406,227 B1 | 6/2002 | Titus et al. | |
| 6,588,995 B1 | 7/2003 | Wills et al. | |

* cited by examiner

*Primary Examiner*—Erica Cadugan
(74) *Attorney, Agent, or Firm*—Seyfarth Shaw LLP

(57) ABSTRACT

An apparatus for positioning a key blank relative to a key cutter. The apparatus includes a frame having an axis. A carriage assembly is attached to the frame and arranged for movement in a generally axial direction and a generally transverse direction relative to the axis. A key blank holder is attached to the carriage assembly. A drive assembly coupled to the carriage assembly is selectively operable to move the carriage assembly in a generally transverse direction. A bias assembly is selectively operable to bias the carriage assembly toward the key cutter.

33 Claims, 5 Drawing Sheets

APPARATUS CAPABLE OF POSITIONING A KEY BLANK RELATIVE TO CUTTING DEVICE IN MULTIPLE OPERATIONAL MODES

BACKGROUND OF INVENTION

The present application relates to key cutting, and more particularly to positioning key blanks during key cutting.

A key is a device, embodying a predetermined code, that functions to open a particular lock or a particular type of lock. Keys have many types, each with a particular size, shape, or modus operandi. One of the most common is a metal key, which includes a plurality of notches having predetermined depths and predetermined spacing therebetween. The spacing and depths of the notches represent the code embodied in the key.

Typically, a metal key is manufactured by applying a key blank to a cutting device, such as a cutting or grinding wheel, and forming each notch according to the code. To duplicate a metal key, there are two options: First, a person privy to the key code can simply cut the pattern of notches into a key blank. This is called code cutting and is performed with a code cutting machine. Second, a person can use a key duplication machine. A key duplication machine utilizes the original key to guide the key blank relative to a cutting wheel to form notches having the same depths and spacing intervals as the notches on the original key.

Code cutting machines and duplication machines often stand alone. In other words, a code cutting machine does not perform duplication, and a duplication machine does not perform code cutting. This is burdensome for locksmiths who want to provide both code cutting and key duplication services to their customers. Accordingly, what is needed is an apparatus capable of positioning a key blank relative to a cutting device in both a code cutting mode and a duplication mode.

SUMMARY OF INVENTION

In one embodiment, an apparatus for positioning a key blank relative to a key cutter is provided. A frame having an axis has a carriage assembly attached thereto. The carriage assembly is arranged for movement in a generally axial direction and a generally transverse direction relative to the axis. A key blank holder is attached to the carriage assembly. A drive assembly is coupled to the carriage assembly for moving it in the generally transverse direction. The drive assembly has generally operable and inoperable conditions. A bias assembly also has operable and inoperable conditions. In a first operational mode, the bias assembly is inoperable, and the drive assembly is operable to impart transverse movement to the carriage assembly. In a second operational mode the bias assembly is operable to bias the carriage assembly toward the key cutter, and the drive assembly is inoperable.

In one embodiment, an apparatus for positioning a key blank relative to a key cutter is provided. The apparatus includes a frame having an axis. A means is provided for connecting the key blank to the frame such that the key blank is moveable in a direction generally axial and a direction generally transverse to the axis. A means is provided for biasing the key blank toward the key cutter, the biasing means having operable and inoperable conditions. A means is provided for driving the connecting means. The driving means includes operable and inoperable conditions. In a first operational mode, the biasing means is inoperable, and the driving means is operable to impart transverse movement to the connecting means. In a second operational mode the driving means is inoperable and the biasing means biases the connecting means toward the key cutter.

In one embodiment, a key cutting machine having a duplication mode and a code cutting mode is provided. The machine includes a frame, a key cutter mounted to the frame, a carriage moveably attached to the frame, and a key blank holder positioned on the carriage. A gauge is mounted to the frame that measures a location of the carriage assembly relative to the key cutter. An engagement member is moveably attached to the carriage. The engagement member is moveable between a first position, corresponding to the code cutting mode, in which it engages the gauge, and a second position, corresponding to the duplication mode, in which it is disengaged from the gauge.

DETAILED DESCRIPTION

Figure 1:
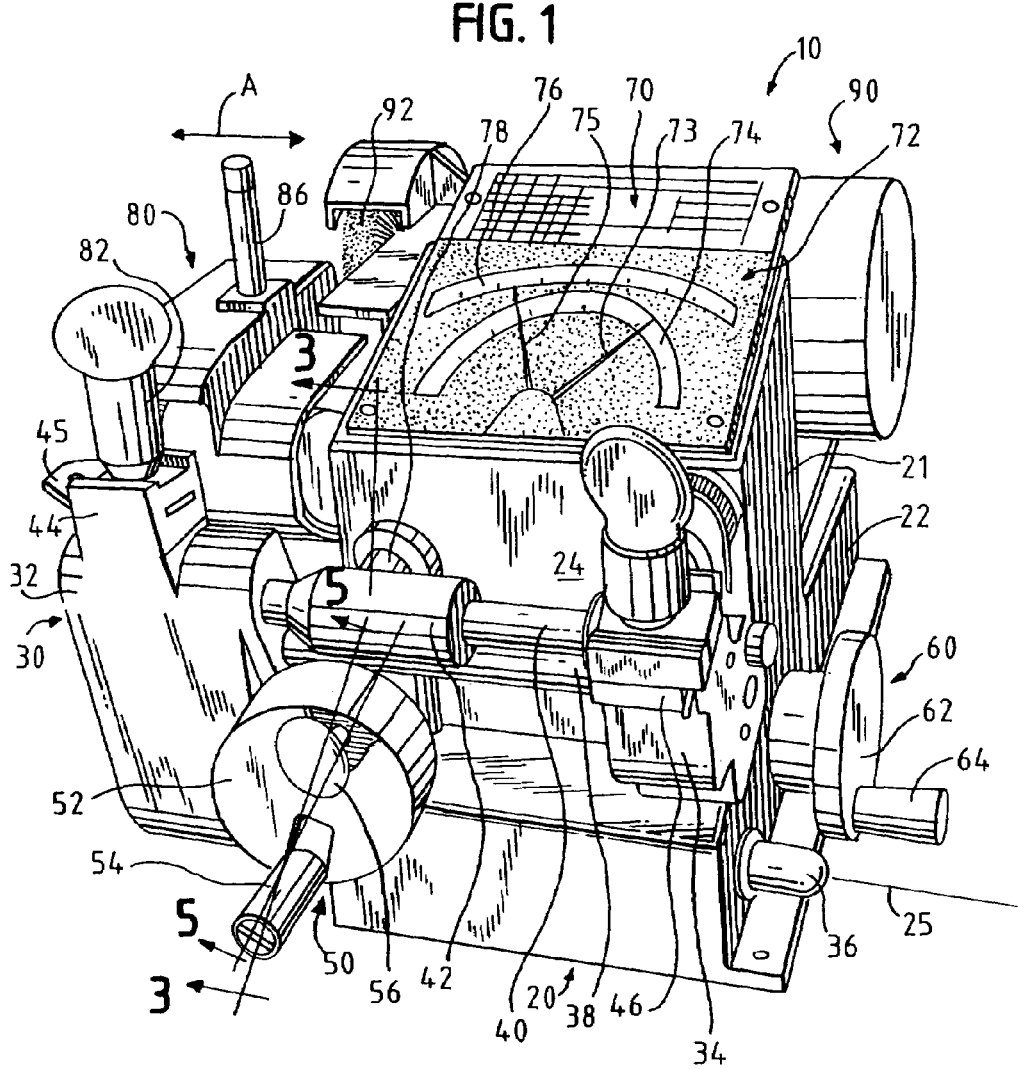
FIG. 1 is a top perspective view of a key cutting machine while in code cutting mode.

Referring to FIG. 1, key cutting machine 10 in one example comprises frame 20, carriage assembly 30, transverse drive assembly 50, axial drive assembly 60, display assembly 70, cutting assembly 80 and motor assembly 90.

Frame 20 is shown in FIG. 1 for exemplary purposes as a housing 21 having sidewalls 22, and end walls 24, which define an enclosure. Some components (e.g. carriage assembly 30) of key cutting machine 10 are shown mounted externally to housing 21, whereas others (e.g. portions of display assembly 70) are internal to housing 21. This is shown for illustrative purposes only. Alternatively, key cutting machine 10 could have another arrangement. For example, frame 20 could comprise one or more support members attached to a base with the components of key cutting machine 10 attached to the support member(s). Frame 20 can be made of any material sufficient to support the components of key cutting machine 10 such that it can operate to produce keys. Examples include, but are not limited to, metals, stainless steel, and plastics. Frame 20 includes at least one axis 25 upon which carriage assembly 30 pivots.

Carriage assembly 30 is mounted to frame 20 such that it moves axially and transversely relative to axis 25. Carriage assembly 30, in one example, comprises first body member 32, a second body member 34, first shaft 36, second shaft 38, third shaft 40, and slide member 42. Carriage assembly 30 is attached to frame 20 by first shaft 36. First shaft 36 is connected on one end to first body member 32 and is pivotally and slidably disposed on frame 20. First body member 32 and second body member 34 are attached together by second shaft 38 and third shaft 40. Slide member 42, in one example, is a collar or cylindrical piece of material disposed on third shaft 40 and capable of sliding longitudinally along the length of third shaft 40. As will be discussed further herein, slide member 42 engages with display assembly 70 to provide a user with a measure of the relative location of carriage assembly 30 with respect to cutting wheel 82 located in cutting assembly 80. A key blank holder 44, shown holding key blank 45, is attached to first body member 32, and a key holder 46 for holding a key to be copied, is attached to second body member 34.

Transverse drive assembly 50 operates to move carriage assembly 30 in a direction transverse to axis 25. Transverse drive assembly 50, in one example, comprises a support shaft (not shown), knob 52, handle 54, and lock pin 56. The support shaft, as will be discussed further herein, is rotatably engaged with frame 20. Knob 52 is attached to the support shaft. In code cutting mode, when knob 52 is rotated clockwise, it bears against carriage assembly 30 and moves carriage assembly 30, in a transverse direction relative to axis 25, toward cutting assembly 80.

Handle 54 is rotatably attached to knob 52. A user grasps handle 54 to rotate knob 52. Handle 54, as will be discussed further herein, also has two positions relative to knob 52. In one position (shown in FIG. 1), handle disengages a bias assembly (not shown) and cutting machine 10 is operable for code cutting. In another position (shown in FIG. 2), handle 54 activates the bias assembly. The bias assembly then forces carriage assembly 30 toward cutting assembly 80 and cutting machine 10 is operable for key duplication.

Lock pin 56 is located in an opening of knob 52. Lock pin 56 is adjustable. Lock pin 56 has a first position, shown in FIG. 5, in which lock pin 56 is retracted from frame 20. This position is appropriate for code cutting. Lock pin 56 also has a second position, shown in FIG. 6, in which one end of lock pin 56 is engaged with frame 20 and knob 52 cannot rotate. This position is appropriate for duplication.

Axial drive assembly 60 moves carriage assembly 30 in an axial direction relative to axis 25. Axial drive assembly includes, a support shaft (not shown), knob 62, and handle 64. A user turns knob 62 through utilization of handle 64 to operate axial drive assembly 60.

Display assembly 70 includes a readout 72 and spring loaded plunger 78. Readout 72, in one example, includes space needle 73, space indicia 74, depth needle 75, depth indicia 76. Space needle 73 communicates with axial drive assembly 60, and in conjunction with space indicia 74, provides the axial location of key blank 45 relative to cutting assembly 80. Depth needle 75 communicates with plunger 78, and in conjunction with depth indicia 76, provides the transverse location of carriage assembly 30 relative to cutting wheel 82.

Space indicia 74 and depth indicia 76 can be provided on separate code cards produced by the manufacturer key cutting machine or by some other party. The code cards provide the code for a particular key to be cut. Examples of the code cards and the mechanisms through which display assembly 70 works can be found in U.S. Pat. Nos. 4,117,763, 4,090,303, 4,012,991, and 5,054,350, which are hereby incorporated by reference.

When knob 62 is turned it engages a mechanism within frame 20 that causes carriage assembly 30 to move axially. In one example, the mechanism includes a steel shaft with embedded threads connected to knob 62 that transfers motion to an aluminum casting that has a dual purpose. The first purpose of the aluminum casting is that it holds a rack that engages the spacing gear, which in turn moves the space needles 73. The other purpose of the aluminum casting is to connect to shaft 36 via a dog point screw, which allows for free depth motion while maintaining constant pressure by utilizing a spring to force the aluminum casting to be biased in one direction to ensure accurate positioning. Shaft 36 is directly connected to carriage 30. This mechanism can be found in the above referenced patents.

Plunger 78 is mounted to frame 20 and is biased toward carriage assembly 30. In key cutting mode, slide member 42 is positioned in engagement with plunger 78. Plunger 78 biases carriage assembly 30 so that it remains in contact with knob 52 of transverse drive assembly 50. When a user operates transverse drive assembly 50, slide member 42 either depresses or withdraws pressure from plunger 78. Plunger 78 engages a mechanism within frame 20 to move depth needle 75 along depth indicia 76. In one example, plunger 78 is connected to a rack, which contacts a gear that is directly connected to depth needle 75. Accordingly, depth needle 75 moves along depth indicia 76 as plunger 78 is depressed and withdrawn. This mechanism can be found in the above referenced patents.

Cutting assembly 80 includes the cutting wheel 82, which is mounted to a shaft (not shown) engaged with motor assembly 90. Cutting wheel 82 rotates around the shaft and also pivots in the direction indicated by arrow "A" to allow a user to make angle cuts. A pivot pin 86, connected to cutting assembly, allows a user to pivot cutting wheel 82.

Motor assembly 90 turns cutting wheel 82. In one example, motor assembly 90 includes a 110 V motor (not shown). The motor is attached to cutting wheel through a mechanism, such as a belt and shaft assembly, which causes motor to turn cutting wheel 82. Alternatively, other motors or other devices, such as hand cranks, could be used to turn cutting wheel. A deburring brush 92 can be attached to a shaft of motor assembly 90 which can be used to deburr a key after cutting.

A description of the operation of key cutting machine 10 while in code cutting mode is provided for illustrative purpose.

To code cut a key, a user inserts key blank 45 into key blank holder 44. The user chooses the particular code card, which corresponds to the key that the user intends to cut. The user inserts the code card into readout 72. The user must then place key cutting machine in the code cutting operational mode. Accordingly, if handle 54 on drive assembly 50 is not in the position shown in FIG. 1, the user places handle 54 in this position. If lock pin 56 is not in the position shown in FIG. 1, the user pulls lock pin 56 back to disengage it from frame 20. The user must also position slide member 42 into engagement with plunger 78. If slide member 42 is not in the position shown in FIG. 1, the user moves slide member 42 into engagement with plunger 78.

The user, by utilizing transverse drive assembly 50 and axial drive assembly 60, then moves carriage assembly 30 such that key blank 45 is in a desired position relative to cutting wheel 82. In the example shown, clockwise rotation of transverse drive assembly 50 causes knob 52 to bear against second shaft 38 of carriage assembly and rotate carriage assembly 30 relative to axis 22. This causes key blank 45 to move toward cutting wheel 82. Conversely, counterclockwise rotation of transverse drive assembly 50 removes the pressure of knob 52 bearing against shaft 38. Plunger 78 then pushes carriage assembly 30, and key blank 45, away from cutting wheel 82. Meanwhile, plunger 78 communicates with display assembly 70 to cause depth needle 75 to move relative to depth indicia 76, and thereby provide the depth of the notch cutting wheel 82 will make in key blank 45.

Clockwise rotation of axial drive assembly 60 causes carriage assembly 30 to move axially toward knob 62.

Counterclockwise rotation causes carriage assembly 30 to move away from knob 62. Axial drive assembly 60 communicates with display assembly 70 to move space needle 73 relative to space indicia 74 as carriage assembly 30 moves. In this manner, user has an indicator of the longitudinal location of the notch that cutting wheel 82 will make on key blank 45. This allows the user to space the notches at appropriate distances from each other. It should be noted that the directions of rotation for both transverse drive assembly 50 and axial drive assembly 60 are provided for illustrative purposes. The directions of rotation could be reversed without departing from the scope of the application.

After moving key blank 45 to a desired spacing location, the user powers motor assembly 90 to turn cutting wheel 82, the user moves key blank 45 to the desired depth location, which then cuts a notch in key blank 45. Alternatively, the user can turn the power on first and then move key blank 45 to the desired position to make a particular cut. As will be understood by those in the art, the user makes a series of cuts on key blank 45 by utilizing transverse drive assembly 50 and axial drive assembly 60 to position key blank 43 in a number of positions relative to cutting wheel 82. The position of key blank relative to cutting wheel 82 is provided to the user by space needle 73, space indicia 74, depth needle 75, and depth indicia 76. In either case, the user makes the cuts on key blank 43 in accordance with the code provided on the code card.

Figure 2:
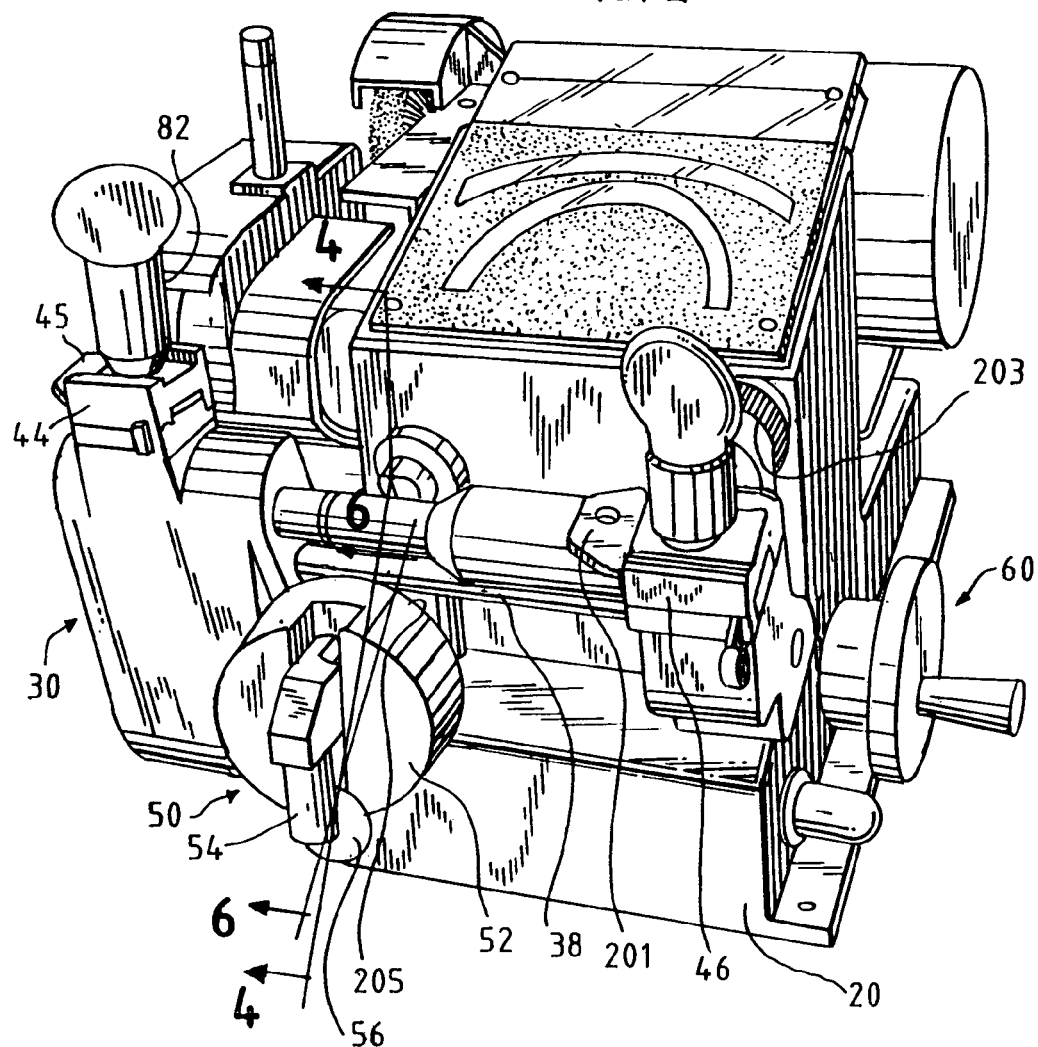
FIG. 2 is a top perspective view of the key cutting machine in FIG. 1 while in duplication mode.

Referring to FIG. 2, an exemplary description of key cutting machine 10 while in duplication mode will now be provided for illustrative purposes.

To duplicate a key, the user places key blank 45 in key blank holder 44 and key 201 in key holder 44. Before duplicating the key 201, the user must place key cutting machine in duplication mode. Accordingly, if handle 54 on drive assembly 50 is not in the position shown in FIG. 2, the user places handle 54 in this position. If lock pin 56 is not in the position shown in FIG. 2, the user pushes lock pin 56 forward to engage it with frame 20. Similarly, the user must also position slide member 42 so that it is not engaged with plunger 78. As will be discussed further herein, by positioning handle 54 as shown in FIG. 2, a pin 205 engages shaft 38 of carriage assembly 30 and biases it toward cutting wheel 82. This forces key 201 into engagement with a key tracer 203, which is mounted to frame 20. By positioning lock pin 56 in engagement with frame 20, transverse drive assembly 50 is disengaged. The disengagement of transverse drive assembly 50 prevents rotation of knob 52, and prevents knob 52 from moving and interfering with the bias pin 205 applies to carriage assembly 30.

After engaging key 201 with key tracer 203, the user powers motor assembly 90. The user then rotates axial drive assembly 60 to move key blank 45 into engagement with cutting wheel 82. As will be understood by those in the art, as carriage assembly 30 moves axially, key tracer 203 traces the notch configuration of key 201.

Carriage assembly 30 maintains key blank 45 and key 201 in a fixed position relative to each other. Accordingly, when key tracer 203 causes the carriage assembly 30 to pivot away from cutting wheel 82, key blank 45 pivots away from cutting wheel 82. When pin 205 causes carriage assembly 30 to pivot toward cutting wheel 82, the key blank 45 pivots toward cutting wheel. In other words, the force of pin 205 pushing carriage assembly 30 toward key tracer 203, and the opposing force of key tracer 203 pushing against key 201, creates a cam-like action that causes carriage assembly 30 to move according to the spaces and depths of the cuts in key 201. This causes cutting wheel 82 to engage key blank 45 at the same locations and depths as key 201.

Figure 3:
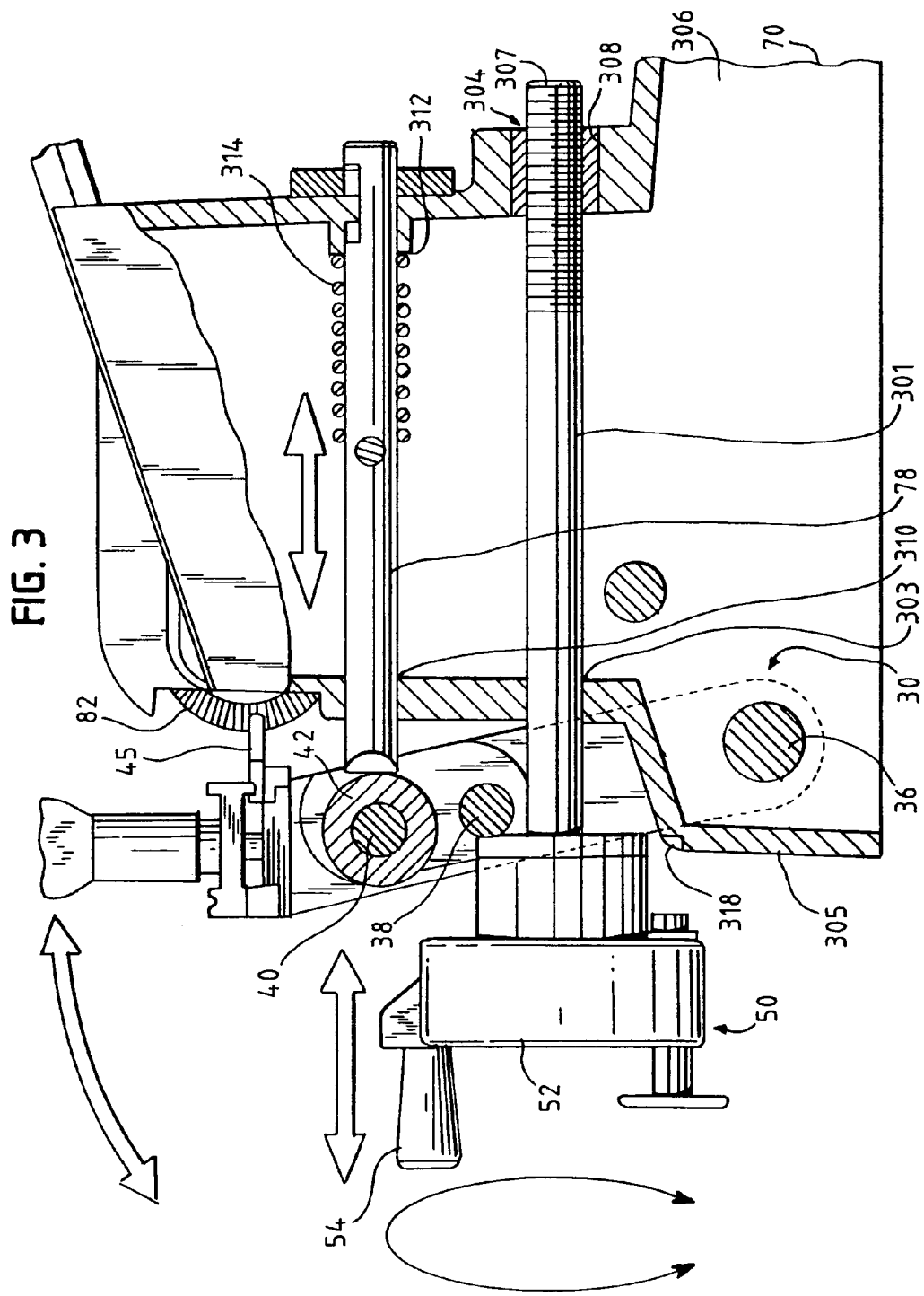
FIG. 3 is a sectional view taken along the line 3—3 of FIG. 1.

Referring to FIG. 3, axial drive assembly 50 includes knob 52 attached to support shaft 301. Support shaft 301 is positioned in openings 303, 304 formed in opposing sidewalls 305, 306 of frame 20. Support shaft 301 has threads 307, which engage threads 308 located in opening 304.

Plunger 78 is positioned in openings 310, 312 located in sidewalls 305, 306. Plunger 78 is biased by spring 314 toward carriage assembly 30.

When key cutting machine 10 is in code cutting mode, pin 205 (FIG. 2) is disengaged, allowing knob 52 to contact second shaft 38 of carriage assembly 30. Lock pin 56 is disengaged from detent 318 located on frame 20 and therefore knob 52 can rotate. Slide member 42 is positioned to engage plunger 78. As knob 52 is rotated, threads 307 on support shaft 301 engage threads 308, which depending on the direction of rotation, draw knob 52 toward or away from carriage assembly 30. If knob 52 is rotated clockwise, knob 52 engages shaft 38 and causes slide member 42 to compress spring 314 on plunger 78 and push key blank 45 toward cutting wheel 82. As knob 52 is rotated counterclockwise, knob 52 is drawn away from shaft 38 and key blank 45 will pivot away from cutting wheel 82 due to the bias of spring 314.

Figure 4:
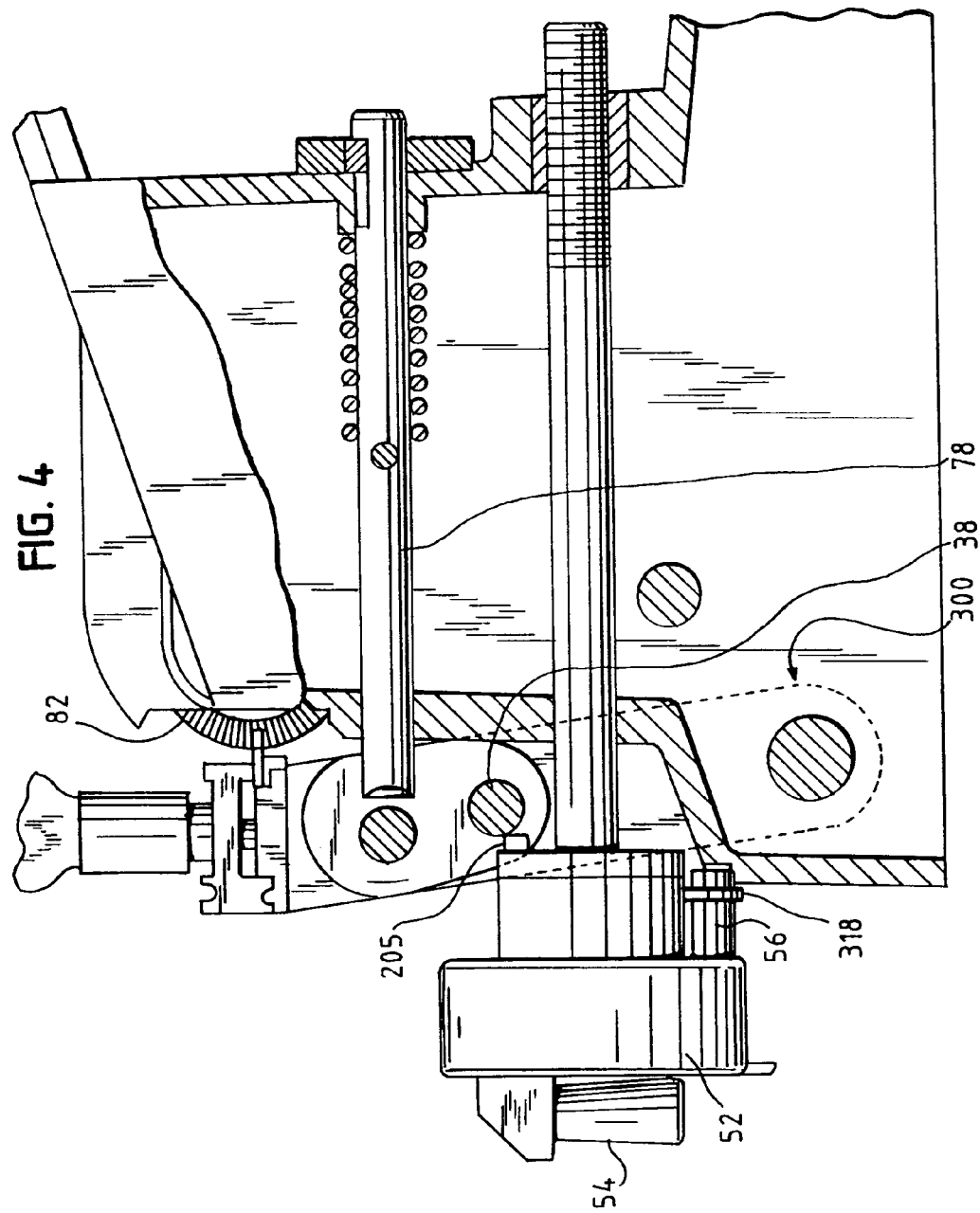
FIG. 4 is a sectional view taken along the line 4—4 of FIG. 2.

Referring to FIG. 4, in duplication mode, pin 205 pushes against shaft 38 and carriage assembly 30 is biased toward cutting wheel 82. In code cutting mode, pin 205 is retracted within knob 52 and does not engage carriage assembly 30 (FIG. 3).

Further, in duplication mode, drive assembly 50 is disengaged by placing knob 52 in the locked position. Knob 52 is locked by engaging lock pin 56 engaged with the detent 318 to prevent clockwise or counterclockwise rotation of the depth crank. Because slide member 42 does not engage with plunger 78, plunger 78 does not bias carriage assembly away from cutting wheel 82.

Figure 5:
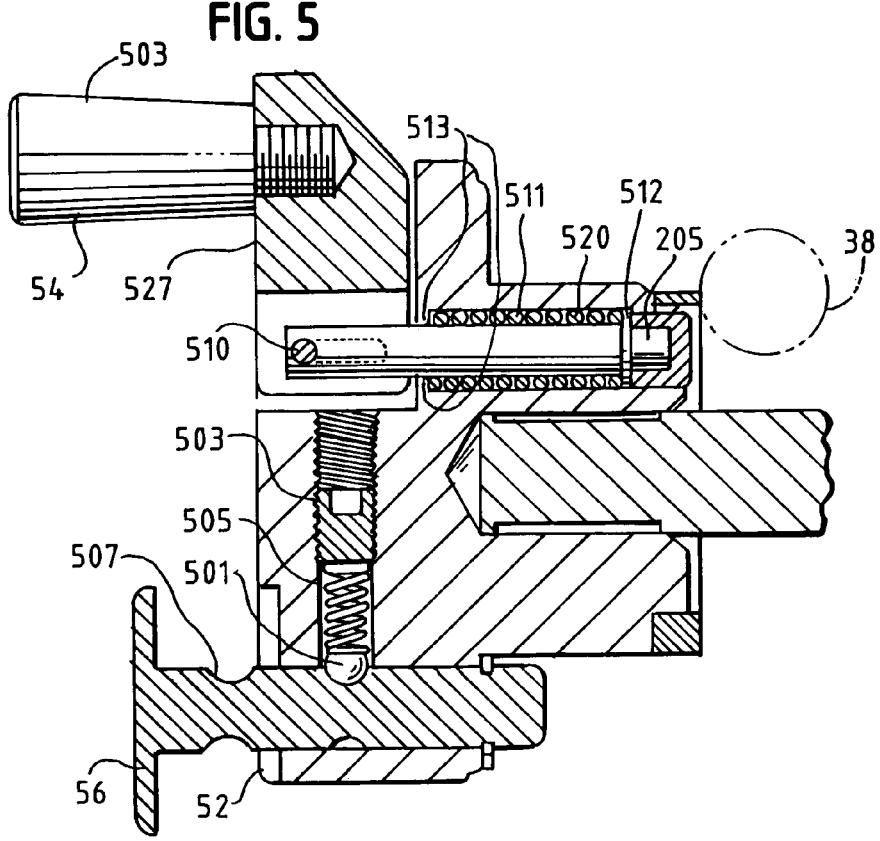
FIG. 5 is an enlarged sectional view taken along line 5—5 of FIG. 1.
Figure 6:
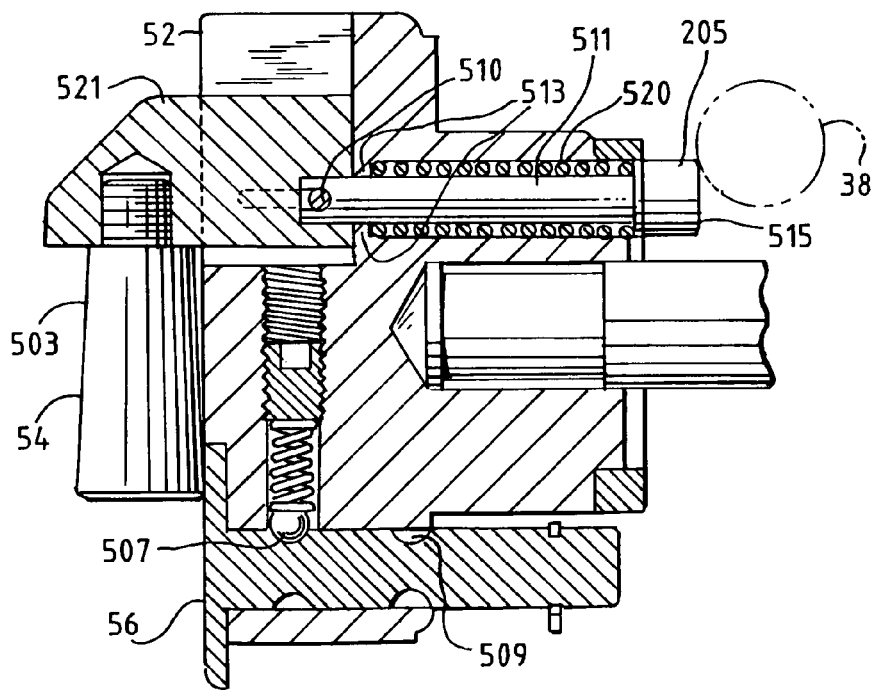
FIG. 6 is an enlarged sectional view taken along line 6—6 of FIG. 2.

Referring to FIGS. 5 and 6, maintaining lock pin 56 in a "locked" or "unlocked" position may be accomplished by a variety of means. In the example, shown, a ball bearing 501 is positioned in a channel 503 located in the interior of knob 52. Ball bearing 501 is biased against the lock pin 56 by a resilient spring 505. Lock pin 56 has first grooves 507 to engage ball bearing 501 in a locked position (FIG. 6), and second groove 509 to engage ball bearing 501 in an unlocked position (FIG. 5).

As was stated earlier, pin 205, in duplication mode (FIG. 6) pushes against shaft 38 to bias carriage assembly toward the cutting wheel. Pin 205 is part of a bias assembly that includes handle 54, pin 205, and spring 520. Handle 54, in one example, includes gripping portion 503 and intermediate portion 521. Handle 54 is rotatably attached to pin 205 at intermediate portion 521 by pivot pin 510. Pin 205 is disposed in a channel 511 located in knob 52. Spring 520 is attached to pin at one end by collar 512. At another end spring engages sidewalls 513 of channel 511. Spring 520 engages sidewalls 513 and biases pin 205 toward shaft 38.

Handle 54 pivots around pin 205, so that when gripping portion 503 is extended (as shown in FIG. 5), pin 205 is retained completely within channel 511. When gripping portion 503 is folded, spring 520 pushes one end 515 of pin 205 out of channel 511. Pin 205 thus engages shaft 38 (FIG. 6).

It should be noted that the particular arrangement of the bias assembly is shown for illustrative purposes only. The bias assembly could be a mechanism separate from knob 52 that engages carriage assembly 30 to push it toward cutting wheel 82 in one mode and disengages from carriage assembly in another mode. For instance, bias assembly could be a spring mounted pin mounted to another portion of frame.

While particular embodiments have been shown and described, it will be apparent to those skilled in the art that changes and modifications may be made without departing from the broader aspects of applicants' contribution. The actual scope of the protection sought is intended to be defined in the following claims when viewed in their proper perspective based on the prior art.

The invention claimed is:

1. An apparatus for positioning a key blank relative to a key cutter, comprising:
   a frame having an axis;
   a carriage assembly attached to the frame and arranged for movement in a generally axial direction and a generally transverse direction relative to the axis;
   a key blank holder attached to the carriage assembly;
   a drive assembly coupled to the carriage assembly for moving it in the generally transverse direction, having operable and inoperable conditions; and
   a bias assembly having operable and inoperable conditions, wherein in a first operational mode, the bias assembly is inoperable, and the drive assembly is operable to impart transverse movement to the carriage assembly, and in a second operational mode, the bias assembly is operable to bias the carriage assembly toward the key cutter, and the drive assembly is inoperable.

2. The apparatus of claim 1, wherein the drive assembly includes:
   a support shaft positioned in an opening on the frame; and
   a knob attached to the support shaft, wherein the knob is engageable with the carriage assembly to impart transverse movement to the carriage assembly.

3. The apparatus of claim 2, wherein the bias assembly includes a pin moveably attached to the knob, and in the first operational mode, the pin is disengaged from the carriage assembly and the knob is arranged to impart transverse movement to the carriage assembly, and in the second operational mode, the pin is engaged with the carriage assembly and biases the carriage assembly toward the key cutter.

4. The apparatus of claim 3, further comprising a handle moveably connected to the knob, wherein the pin has a first end connected to the handle and a second end for engagement with the carriage assembly.

5. The apparatus of claim 4, wherein the pin is disposed in a channel formed in the knob.

6. The apparatus of claim 5, further comprising a biasing spring having a first end attached to the pin near the second end and a second end engaged with a sidewall of the channel such that the biasing spring directs the pin toward the carriage assembly.

7. The apparatus of claim 6, wherein the handle is adjustable from a first position, corresponding to the first mode of operation, in which the handle retracts the pin into the channel, and a second position, corresponding to the second mode of operation, in which the handle and the biasing spring cooperate to extend the pin from the channel into engagement with the carriage assembly.

8. The apparatus of claim 1, wherein the carriage assembly includes:
   a first body member; and
   a first shaft having one end connected to the first body member, and being rotatably and slidably disposed in an opening located on the frame.

9. The apparatus of claim 8, wherein the key blank holder is attached to the first body member.

10. The apparatus of claim 9, wherein the carriage assembly further comprises:
    a second body member; and
    a second shaft connecting the second body member to the first body member.

11. The apparatus of claim 10, further comprising a key holder attached to the second body member.

12. The apparatus of claim 11, further comprising a key tracer mounted to the frame, wherein in the second mode of operation the key tracer and a key in the key holder cooperate with the bias assembly to control the transverse movement of the carriage assembly.

13. The apparatus of claim 10, wherein the carriage assembly further comprises a third shaft having one end attached to the first body member and another end attached to the second body member.

14. The apparatus of claim 13, further comprising:
    a plunger moveably attached to the frame, wherein in the first mode of operation, the third shaft engages the plunger, which provides an indication of an axial position of the carriage assembly relative to the frame.

15. The apparatus of claim 14, further comprising a slide member positioned on the third shaft, wherein in the first mode of operation, the slide member is positioned in engagement with the plunger, and in the second mode of operation, the slide member is positioned in disengagement with the plunger.

16. The apparatus of claim 1, wherein the drive assembly includes a lock pin and the frame includes a detent located thereon, and the drive assembly is disengaged through engagement of the lock pin with the detent in the frame.

17. An apparatus for positioning a key blank relative to a key cutter, comprising:
    a frame having an axis;
    means for connecting the key blank to the frame such that the key blank is moveable in a generally axial direction and a direction generally transverse to the axis;
    means for biasing the key blank toward the key cutter, the biasing means having operable and inoperable conditions; and
    means for driving the connecting means, the driving means having operable and inoperable conditions, wherein in a first operational mode, the biasing means is inoperable, and the driving means is operable to impart transverse movement to the connecting means, and in a second mode of operation the driving means is inoperable and the biasing means biases the connecting means toward the key cutter.

18. The apparatus of claim 17, wherein the connecting means includes a means for holding the key blank.

19. The apparatus of claim 18, wherein the connecting means further comprises means for holding a key to be duplicated.

20. The apparatus of claim 19, further comprising means for cooperating with the key to be duplicated, in the second mode of operation, to control the transverse movement of the connecting means.

21. The apparatus of claim 19, wherein the connecting means further comprises means for attaching the key blank holding means and the key holding means.

22. The apparatus of claim 21, wherein the attaching means includes:
    means for engaging a depth plunger located on the frame; and
    means for engaging the driving means.

23. The apparatus of claim 22, wherein the means for engaging the depth plunger comprises a slide member adjustable from a first position in which it contacts the depth plunger and a second position in which it does not contact the depth plunger.

24. The apparatus of claim 17, wherein the driving means includes means for engaging the connecting means when in the first mode of operation and means for engaging the connecting means when in the second mode of operation.

25. The apparatus of claim 17, wherein the driving means includes locking means for preventing adjustment of the driving means.

26. The apparatus of claim 17, further comprising:
a means for selecting between the first operational mode and the second operational mode.

27. A method of using a key cutting machine, comprising:
inserting a key blank in a key blank holder positioned on a carriage assembly arranged for generally axial movement and generally transverse movement with respect to an axis of a frame to which the carriage assembly is mounted,
selecting between a first operational mode for the key cutting machine, wherein a drive assembly is operational to move the carriage assembly transversely and a bias assembly, for biasing the carriage assembly toward the key cutter, is not operational, and a second operational mode, wherein the drive assembly is not operational, and the bias assembly is operational,
positioning the key blank relative to the key cutter in the selected operational mode.

28. The method of claim 27, wherein the step of selecting an operational mode includes:
selecting the first operational mode through disengagement of the bias assembly by retracting a pin in engagement with the carriage assembly.

29. The method of claim 28, wherein the step of positioning includes:
rotating a depth control cam to transversely move the carriage assembly.

30. The method of claim 27, wherein the step of selecting an operational mode includes:
selecting the second operational mode by arresting rotation of a depth control cam by depressing a lock pin located on the depth control cam such that the lock pin engages a corresponding detent on the frame of the key cutting machine.

31. The method of claim 27, wherein the step of selecting an operational mode includes:
selecting the second operational mode through engagement of the bias assembly by positioning a pin in engagement with the carriage assembly.

32. The method of claim 31, further comprising:
inserting a key to be copied into a key holder on the carriage assembly,
engaging the key to be copied with a key tracer, rotating a space control cam to move the carriage assembly axially.

33. A key cutting machine having a duplication mode and a code cutting mode, comprising:
a frame;
a key cutter mounted to the frame;
a carriage moveably attached to the frame;
a key blank holder positioned on the carriage;
a gauge mounted to the frame that measures a location of the carriage assembly relative to the key cutter; and
an engagement member moveably attached to the carriage, wherein the engagement member is moveable between a first position, corresponding to the code cutting mode, in which it engages the gauge, and a second position, corresponding to the duplication mode, in which it is disengaged from the gauge.

* * * * *